United States Patent [19]

Röber et al.

[11] Patent Number: 5,500,263
[45] Date of Patent: Mar. 19, 1996

[54] MULTILAYER PLASTIC PIPE

[75] Inventors: Stefan Röber; Hans Jadamus, both of Marl; Michael Böer, Oer-Erkenschwick; Roland Feinauer, Marl; Hans-Dieter Herrmann, Marl; Hans Ries, Marl, all of Germany

[73] Assignee: Huels Aktiengesellschaft, Marl, Germany

[21] Appl. No.: 187,504

[22] Filed: Jan. 28, 1994

[30] Foreign Application Priority Data

Apr. 2, 1993 [DE] Germany .......................... 43 10 884.9

[51] Int. Cl.$^6$ ........................................... B32B 1/08
[52] U.S. Cl. ..................... 428/36.6; 428/35.7; 428/36.7; 428/36.91; 428/421; 138/140; 138/141; 138/137; 138/DIG. 8
[58] Field of Search .................. 428/35.7, 36.6, 428/36.7, 36.91, 421; 138/140, 141, DIG. 8, 137

[56] References Cited

U.S. PATENT DOCUMENTS

| | | | |
|---|---|---|---|
| 3,857,754 | 12/1974 | Hirata et al. | 428/35.7 |
| 4,497,856 | 2/1985 | Iwasawa et al. | 428/35 |
| 4,727,117 | 2/1988 | Hallden-Abberton et al. | 525/343 |
| 4,971,847 | 11/1990 | Freed | 428/36.7 |
| 5,038,833 | 8/1991 | Brunnhofer | 138/137 |
| 5,258,213 | 11/1993 | Mügge et al. | 428/36.91 |
| 5,383,087 | 1/1995 | Noone et al. | 361/215 |

FOREIGN PATENT DOCUMENTS

| | | |
|---|---|---|
| 0094215 | 11/1983 | European Pat. Off. . |
| 0469925 | 2/1992 | European Pat. Off. . |
| 4001126 | 12/1990 | Germany . |
| WO93/25835 | 12/1993 | WIPO . |

*Primary Examiner*—James J. Seidleck
*Assistant Examiner*—Michael A. Williamson
*Attorney, Agent, or Firm*—Oblon, Spivak, McClelland, Maier & Neustadt

[57] ABSTRACT

The present invention relates to a plastic pipe having improved resistance, inter alia, to methanol-containing fuels and improved mechanical properties, comprising.

(I) at least one outer layer, (II) at least one inner layer comprising a polyvinylidene fluoride molding composition, and (III) a layer, disposed between the inner layer II and the outer layer I, comprising a molding composition comprising a mixture of:
(a) polyamide and
(b) polyalkyl acrylate, wherein the layers (I)–(III) are adhesively bonded to one another.

11 Claims, No Drawings

MULTILAYER PLASTIC PIPE

BACKGROUND OF THE INVENTION

1. Field of the Invention

The invention relates to a multilayer plastic pipe based on polyvinylidene fluoride comprising an outer layer (I), an inner layer (II) and a layer (III) disposed between said layers (I) and (II) based on a mixture of polyamide and polyalkyl acrylate.

2. Discussion of the Background

Plastic pipes made from polyamide have previously been employed for a variety of applications. It is known that in order to achieve their objective, the pipes must be, inter alia, inert to the medium flowing in them, and must be resistant to high and low temperatures and mechanical stresses.

Single-layer pipes are not always capable of satisfying the necessary requirements. In the case of transport of, for example, aliphatic or aromatic solvents, fuels or the like, they exhibit considerable disadvantages, such as a poor barrier action to the medium, undesired changes in dimension or inadequate resistance to mechanical stresses.

Attempts to overcome these disadvantages have included the use of multilayer pipes (DE-A 35 10 395; DE-A 37 15 251; DE-A 38 21 723; DE-A 40 01 125 and DE-A 40 01 126). However, practical implementation of these proposals has shown that, although some disadvantages can be overcome, the overall property profile is still unsatisfactory.

French Patent 2 602 515 describes a two-layer pipe comprising an outer layer of nylon 11 and an inner layer of plasticized polyvinylidene fluoride. However, investigations have shown that the barrier action to the flowing medium is unsatisfactory.

In particular, permeation of methanol-containing fuels has only been reduced to an inadequate extent by means of the abovementioned proposals.

Reduction in permeation by using novel intermediate layers is therefore of crucial importance because, in particular, the legally permitted emission values are constantly being reduced.

SUMMARY OF THE INVENTION

The object of the present invention is to develop a polyamide pipe having a good barrier action to the transported medium, in particular to methanol-containing fuels, satisfactory dimensional stability and satisfactory resistance to mechanical stresses.

The present inventors have now discovered that this object is achieved by a multilayer plastic pipe which comprises:

(I) at least one outer layer, (II) at least one inner layer based on a polyvinylidene fluoride molding composition, and (III) a layer, disposed between the inner layer (II) and outer layer (I), based on a molding composition comprising a mixture of:
 (a) polyamide, and
 (b) poly(alkyl)acrylate, where the layers (I)–(III) are adhesively bonded to one another.

DETAILED DESCRIPTION OF THE PREFERRED EMBODIMENTS

Suitable materials useful in accordance with the present invention for the outer layer (I) and for component (IIIa) include aliphatic homo- and copolycondensates. Polyamides which can be selected for components (I) and (IIIa) may be identical or different. Suitable examples include polyamides (nylons) 4.6, 6.6, 6.12, 8.10 and 10.10. Preferably, polyamides 6, 10.12, 11, 12 and 12.12 are used. The numbering of the polyamides corresponds to the international standard, the first number(s) indicating the number of carbon atoms in the starting diamine and the final number(s) indicating the number of carbon atoms in the dicarboxylic acid. If only one number is given, the starting material was an $\alpha,\omega$-aminocarboxylic acid or the lactam derived therefrom (H. Domininghaus, Die Kunststoffe und ihre Eigenschaften [Plastics and their Properties], page 272, VDI-Verlag (1976)).

Suitable copolyamides useful in accordance with the present invention can contain, for example, adipic acid, sebacic acid, suberic acid, isophthalic acid or terephthalic acid as co-acid or bis(4-aminocyclohexyl)methane, trimethylhexamethylenediamine, hexamethylenediamine or the like as co-diamine. These polyamides can be prepared by conventional methods (for example D. B. Jacobs, J. Zimmermann, Polymerization Processes, pp. 424–67; Interscience Publishers, New York (1977); DE-B 21 52 194).

Other suitable polyamides useful in accordance with the present invention are mixed aliphatic/aromatic polycondensates, as described, for example, in U.S. Pat. Nos. 2,071,250; 2,071,251; 2,130,523; 2,130,948; 2,241,322; 2,312,966; 2,512,606 and 3,393,210, and in Kirk-Othmer, Encyclopedia of Chemical Technology, 3rd Edn., Vol. 18, pages 328 and 435, Wiley & Sons (1982). Other polycondensates which are suitable as polyamides are poly(ether ester amides) and poly(ether amides). Products of this type are described, for example, in DE-A 27 12 987, DE-A 25 23 991 and DE-A 30 06 961.

The number average molecular weight of the polyamides is greater than 5,000 g/mol, preferably greater than 10,000 g/mol. These molecular weights correspond to a relative viscosity ($\eta_{rel}$) in the range of from 1.9 to 2.4.

Preference is given to polyamides which contain <50% of amino terminal groups, in particular <20% of amino terminal groups.

The polyamides of the outer layer (I) and/or component (IIIa) may contain up to 40% by weight of other thermoplastics, so long as the latter do not adversely affect the properties according to the invention. Suitable thermoplastics include polycarbonate (H. Schnell, Chemistry and Physics of Polycarbonates, Interscience Publishers, New York (1981), acrylonitrile-styrene-butadiene copolymers (Houben-Weyl, Methoden der organischen Chemie [Methods of Organic Chemistry], Vol. 14/1, Georg Thieme Verlag Stuttgart, pp. 393–406; Ullmanns Encyclopädie der technischen Chemie [Ullmann's Encyclopaedia of Industrial Chemistry], 4th Edition, Vol. 19, Verlag Chemie, Weinheim (1981), pp. 279–284), acrylonitrile-styrene-acrylate copolymers (Ullmanns Encyclopädie der technischen Chemie [Ullmann's Encyclopaedia of Industrial Chemistry], 4th Edition, Vol. 19, Verlag Chemie, Weinheim (1981), pp. 277–295), acrylonitrile-styrene copolymers (Ullmanns Encyclopädie der technischen Chemie [Ullmann's Encyclopaedia of Industrial Chemistryl, 4th Edition, Vol. 19, Verlag Chemie, Weinheim (1981) pp. 273 ff.) or polyphenylene ethers (DE-A 32 24 691 and DE-A 32 24 692, and U.S. Pat. Nos. 3,306,874; 3,306,875 and 4,028,341).

If necessary, the polyamides can be impact-modified. Suitable modifiers include ethylene-propylene or ethylene-propylene-diene copolymers (EP-A-295 076), polypentenylene, polyoctenylene or random or block copolymers made from alkenyl-aromatic compounds with aliphatic olefins or dienes (EP-A-261 748). Other suitable modifiers include impact-modifying rubbers such as core/shell rubbers having a tough, resilient core of (meth)acrylate, butadiene or styrene-butadiene rubber having glass transition temperatures $T_g$ of $<-10°$ C., where the core may be crosslinked. The shell can be built up from styrene and/or methyl methacrylate and/or further unsaturated monomers (DE-A 21 44 528 and DE-A 37 28 685). The proportion of impact-modifying component should be selected so that the desired properties are not impaired.

The inner layer (II) contains, in particular, polyvinylidene fluoride, which is preferably employed in plasticizer-free form. Polyvinylidene fluoride can be prepared by conventional methods (Hans R. Kricheldorf, Handbook of Polymer Synthesis, Part A, published by Marcel Dekker Inc., New York—Basle—Hongkong, p. 191 ff.; Kunststoff Handbuch [Plastics Handbook], 1st Edition, Volume XI, Carl Hanser Verlag, Munich, (1971), pp. 403 ff.).

Copolymers based on polyvinylidene fluoride and containing up to 40% by weight of other monomers can also be used in the inner layer (II). Suitable additional monomers include trifluoroethylene, ethylene, propene and hexafluoropropene.

The polyvinylidene fluoride useful in accordance with the present invention suitably has a melt flow index of <17 g/10 min, preferably from 2 to 13 g/10 min (DIN 53 735).

Component (IIIb) is suitably a polyalkyl acrylate having 1 to 6 carbon atoms in the carbon chain of the alcohol or alkyl radical. Methyl is the preferred carbon chain of the alcohol or alkyl radical. These polyalkyl acrylates suitably have a melt flow index of from 0.8 to 30 g/10 min, preferably from 0.2 to 15 g/10 min. Suitable polyalkyl acrylates include polymethyl methacrylate and polybutyl methacrylate.

Copolymers of polyalkyl acrylates can also be used as component (IIIb). Thus, up to 50% by weight, preferably from to 30% by weight, of the polyalkyl acrylate may be replaced by other monomers including, for example, (meth)acrylic acid, hexyl (meth)acrylate, styrene, maleic anhydride or the like. Preferably copolymers of methyl (meth)acrylate containing <30% by weight, preferably from 12 to 18% by weight, based on the total weight of the copolymer, of styrene and $\leq 20\%$ by weight, preferably from 8 to 12% by weight, based on the total weight of the copolymer, of maleic anhydride.

Component (IIIb) can also be a polyglutarimide containing the following basic units:

i) <100% by weight, preferably 40 to 80% by weight

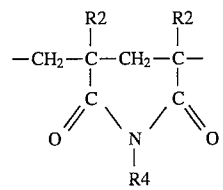

ii) <100% by weight, preferably from 10 to 50% by weight

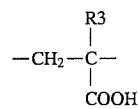

iii) <30% by weight, preferably from 1 to 15% by weight

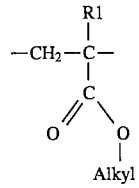

where alkyl is methyl, ethyl, propyl, butyl or hexyl, and $R_1$ to $R_4$, identical or different, are hydrogen or $(C_nH_{2n+1})$ where n is 0 to 6. Preferably, $R_1$ to $R_4$ are methyl radicals.

Polyglutarimides are polyalkyl (meth)acrylates in which two adjacent carboxyl(ate) groups have been reacted to form a cyclic acid imide. The imide is preferably formed using ammonia or primary amines such as, for example, methylamine. Polyglutarimides can be prepared according to conventional methods (Hans R. Kricheldorf, Handbook of Polymer Synthesis, Part A, published by Marcel Dekker Inc., New York—Basle— Hongkong, p. 223 ff.; H. G. Elias, Makromoleküle, Hüthig und Wepf Verlag Basle—Heidelberg—New York; U.S. Pat. Nos. 2,146,209 and 4,246,374).

In order to increase the low-temperature impact strength, the polyglutarimides may also contain appropriate modifiers. For example, core/shell polymers having a polybutyl acrylate core and a polymethyl methacrylate and/or polyglutarimide shell can be used. In addition to these modifiers, other modifiers are also possible.

Components (IIIa) and (IIIb) are suitably employed in a weight ratio of from 50 to 90:50 to 10, preferably of from 60 to 80:40 to 20.

The molding compositions for the layers (I) to (III) may contain conventional auxiliaries and additives, such as, for example, flameproofing agents, stabilizers, plasticizers, processing auxiliaries, viscosity improvers, fillers (in particular those for improving conductivity), pigments and the like. The amount of said agents should be metered so that the desired properties are not seriously affected.

The molding composition for the layer (III) is prepared by conventional and known processes by mixing the melts of components (IIIa) and (IIIb) in a mixer which provides good compounding, such as, for example, a twin-screw extruder, at temperatures which depend on the melting points of components (IIIa) and (IIIb), in general at temperatures between 200° and 300° C.

The preparation of the molding composition for the layer (III) can also be carried out directly in a feed extruder employed in the coextrusion or injection molding line used for the production of the multilayer pipes, so that the molding composition for the layer (III) can be converted directly after its production—without further interim storage—into a layer of the multilayer pipe.

The multilayer pipes are produced in a known manner, for example as described above in the prior art.

In the preferred embodiments, the multilayer pipes have a three-layer structure: Component (I)/component (III)/component (II). In addition, it is also possible, in addition to a 3-layer pipe, to produce other types of pipe having more than 3 layers. Preference is given to novel multilayer pipes in which layer (II) has been modified to be electroconductive. It is also possible to achieve good conductivity by incorporating a further polyvinylidene layer of high conductivity adjacent to and inside layer (II). Good electroconductivity is achieved by adding up to 15% by weight of, for example, conductive black, carbon fibers or the like.

Multilayer pipes in which the outer layer (I) is formed by the same material as component (III) can also be used.

In a multilayer pipe having an external diameter of 8 mm and an overall wall thickness of 1 mm, layer thicknesses can be, for example, from the inside outwards, 0.1 mm, 0.1 mm and 0.8 mm (that is, component (I), component (III) and component (II) respectively). Other layer-thickness distributions are also conceivable according to the invention, for example, a relatively thick central layer of, for example, 0.2 mm can be used.

The multilayer pipes according to the invention have extremely good resistance and a good barrier action to diffusion of (petro)chemical substances, solvents and fuels. Furthermore, as the three layers are adhesively bonded to one another, delamination of the various layers from one another does not occur, for example during thermal expansion or flexing of the pipe.

The plastic pipes according to the invention are preferably employed for the transport of (petro)chemical substances or in the motor vehicles for carrying brake, cooling and hydraulic fluids and fuel. A further use of the multilayer pipes is for the production of hollow articles, such as motor vehicle fuel tanks or filling nozzles.

EXAMPLES

Having generally described this invention, a further understanding can be obtained by reference to certain specific examples which are provided herein for purposes of illustration only and are not intended to be limiting unless otherwise specified.

The parameters mentioned were determined using the measurement methods below.

The determination of the solution viscosity (relative viscosity $\theta_{rel}$) of the polyamides is carried out using a 0.5% strength by weight m-cresol solution at 25° C. in accordance with DIN 53 727/ISO 307.

For the determination of the amino terminal groups, 1 g of the polyamides is dissolved in 50 ml of m-cresol at 25° C. The solution is titrated potentiometrically with perchloric acid.

For the determination of the carboxyl terminal groups in the polyamides, 1 g of polycondensate is dissolved in 50 ml of benzyl alcohol under a nitrogen blanket at 165° C. The dissolution time is a maximum of 20 minutes. The solution is titrated with a solution of KOH in ethylene glycol (0.05 mol of KOH/l) against phenolphthalein until the color changes.

The determination of the melt flow index of the polyvinylidene fluorides is carried out at 230° C. under a load of 5 kg (DIN 53 735).

The determination of the melt flow index of the polyalkyl (meth)acrylate is carried out at 230° C. under a load of 3.8 kg (DIN 53 735).

The testing of the ease of mechanical separation at the interface is carried out using a metal wedge (edge angle: 5°; loading weight: 2.5 kg); in this test, it is attempted to separate the material interface layer to be tested. If separation takes place at the interface between the components, the adhesion is poor. If, by contrast, the separation takes place wholly or partly within one of the two components, good adhesion is present.

The determination of the diffusion of fuel components is carried out on pipes using a fuel mixture (fuel M15:42.5 parts by volume of isooctane, 42.5 parts by volume of toluene and 15 parts by volume of methanol) at 23° C. and 50% atmospheric humidity. The samples, having a length of 200 mm, are filled with the fuel mixture and are connected to a filled stock tank during the measurement. Diffusion is determined as the loss in weight by diffusion over time (measurement every 24 hours). The unit indicated is the weight loss recorded per unit area, measured when the diffusion process has achieved equilibrium, i.e. when the weight loss determined per 24 hours no longer changes with time.

Examples denoted by letters are not according to the invention.

A. Component I.

PA 1: Polyamide 12 ($\eta_{rel}$: 2.1; Plasticizer content: 0; terminal amino group content: 9 mmol/kg; terminal carboxyl group content: 48 mmol/kg; VESTAMID® L 2140—HÜLS AG)

PA 2: Polyamide 12 ($\eta_{rel}$: 2.1; Plasticizer content per 100 parts by weight of polyamide: 15 parts by weight of N-n-butylbenzenesulphonamide; terminal amino group content: 9 mmol/kg; terminal carboxyl group content: 48 mmol/kg; VESTAMID® L 2124—HÜLS AG)

PA 3: Polyamide 6.12 ($\eta_{rel}$: 1.9; Plasticizer content: 0)

B. Component II.

PVDF 1: Polyvinylidene fluoride (Melt Flow Index: 13 g/10 min); DYFLOR® LE—HÜLS AG).

PVDF 2: Polyvinylidene fluoride (Melt Flow Index: 8.5 g/10 min); DYFLOR® EE—HÜLS AG).

PVDF 3: Polyvinylidene fluoride comprising a) 100 parts by weight of polyvinylidene fluoride (Melt Flow Index: 8.5 g/10 min; DYFLOR® EE—HÜLS AG) and b) 6 parts by weight of commercially available conductive black (Ketjenblack EC 300—AKZO)

C. Component III.

Z.1: A mixture comprising a) 20 parts by weight of polyamide 12 ($\theta_{rel}$: 2.1; Plasticizer content: 0; terminal amino group content: 9 mmol/kg; terminal carboxyl group content: 48 mmol/kg; VESTAMID® L 2140—HÜLS AG) and b) 80 parts by weight of polymethyl methacrylate (Melt Flow Index: 3 g/10 min; PLEXIGLAS® 8N-RÖHM GMBH), prepared in a twin-screw compounder at a material temperature of 300° C.

Z.2: A mixture comprising a) 70 parts by weight of polyamide 12 ($\theta_{rel}$: 2.1; Plasticizer content: 0; terminal amino group content: 9 mmol/kg; terminal carboxyl group content: 48 mmol/kg; VESTAMID® L 2140—HÜLS AG) and b) 30 parts by weight of a copolymer based on polymethyl methacrylate (Melt Flow Index: 1.8 g/10 min), comprising b.1 75 parts by weight of methyl methacrylate, b.2 15 parts by weight of styrene and b.3 10 parts by weight of maleic anhydride, prepared in a twin-screw compounder at a material temperature of 290° C.

Z.3: A mixture comprising a) 70 parts by weight of polyamide 12 (θrel: 2.1; Plasticizer content: 0; terminal amino group content: 9 mmol/kg; terminal carboxyl group content: 48 mmol/ kg; VESTAMID® L 2140—HÜLS AG) and b) 30 parts by weight of a copolymer comprising
  b.1 10% by weight of methacrylic acid and
  b.2 90% by weight of polyglutarimide, prepared by imidization of polymethyl methacrylate using methylamine, so that 30% by weight of component b.2 comprises imide units, prepared in a twin-screw compounder at a material temperature of 280° C.
Z.4: A mixture comprising
a) 60 parts by weight of polyamide 12 ($\theta_{rel}$: 2.1; Plasticizer content: 0; terminal amino group content: 9 mmol/kg; terminal carboxyl group content: 48 mmol/kg; VESTAMID® L 2140—HÜLS AG) and
b) 40% by weight of polyglutarimide, prepared by imidization of polymethyl methacrylate using methylamine, so that 30% by weight of component b. comprises imide units, prepared in a twin-screw compounder at a material temperature of 280° C.
Z.5: A mixture comprising
a) 50 parts by weight of polyamide 12 ($\theta_{rel}$: 2.1; Plasticizer content: 0; terminal amino group content: 9 mmol/kg; terminal carboxyl group content: 48 mmol/kg; VESTAMID® L 2140—HÜLS AG) and
b) 50 parts by weight of a copolymer comprising
  b.1 10% by weight of methacrylic acid and
  b.2 90% by weight of polyglutarimide containing 30% by weight of imide units, prepared by imidization of polymethyl methacrylate using methylamine, prepared in a twin-screw compounder at a material temperature of 280° C.
Z.6: A mixture comprising
a. 75 parts by weight of a mixture of
  a.1 60% by weight of polyamide 12 ($\theta_{rel}$: 2.1; Plasticizer content: 0; terminal amino group content: 9 mmol/kg; terminal carboxyl group content: 48 mmol/kg; VESTAMID® L 2140 HÜLS AG) and
  a.2 40% by weight of polyamide 10.12 ($\theta_{rel}$: 2.0; Plasticizer: 0) and
b. 25 parts by weight of polyglutarimide containing 30% by weight of imide units, obtained by imidization of polymethyl methacrylate by means of methylamine, prepared in a twin-screw compounder at a material temperature of 260° C.

D. Production of the multilayer pipes

The pipes were produced on a bench extrusion line using a five-layer die (in the production of the three-layer pipes, 2 channels remain closed, and in the production of the two-layer pipe, 3 channels remain closed). The barrel temperatures were 230° C. (PA 1, PA 2 and PA 3), 250° C. (PVDF 1, PVDF 2 and PVDF 3), 260° C. (Z 2, Z 3, Z 4 and Z 5) and 290° C. (Z 1). The layer thicknesses of the three-layer pipes are, from the inside outwards: 0.18 mm, 0.07 mm and 0.75 mm. The layer thicknesses of the two-layer pipe are, from the inside outwards: 0.18 mm and 0.82 mm.

The mechanical properties of the above multilayered pipes are summarized in the following table.

| | | | | | Mechanically separable at interface | | | |
| | | | | | After storage at 23° C. | | After storage in fuel* | |
| Experiment | Layer I | Layer III | Layer II | Diffusion [g/d m²] at 23° C. | Layer I/III | Layer II/III | Layer I/III | Layer II/III |
| --- | --- | --- | --- | --- | --- | --- | --- | --- |
| A | PA 1 | PA 1 | PA 1 | 30 | no | no | no | no |
| B | PA 2 | PA 2 | PA 2 | 90 | no | no | no | no |
| C | PA 1 | PA 1 | PVDF 1 | 1.2 | no | yes | no | yes |
| D | PA 2 | Z 1 | PVDF 1 | 1.2 | yes | no | yes | no |
| E | PA 2 | Z 2 | PA 2 | 92 | no | no | no | no |
| 1 | PA 2 | Z 2 | PVDF 1 | 1.2 | no | no | no | no |
| 2 | PA 2 | Z 3 | PVDF 2 | 1.2 | no | no | no | no |
| 3 | PA 1 | Z 4 | PVDF 2 | 1.1 | no | no | no | no |
| 4 | PA 3 | Z 5 | PVDF 3 | 1.4 | no | no | no | no |
| 5 | PA 4 | Z 3 | PVDF 3 | 1.5 | no | no | no | no |
| 6 | PA 1 | Z 6 | PVDF 2 | 1.1 | no | no | no | no |
| 7 | — | Z 3 | PVDF 2 | 1.6 | — | no | — | no |

*Storage at 23° C. for 5 days in standard fuel M15

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A multilayer plastic pipe comprising,
  (I) at least one outer layer,
  (II) at least one inner layer comprising a polyvinylidene fluoride molding composition, and
  (III) a layer, disposed between said outer layer (I) and said inner layer (II), comprising a molding composition comprising mixture of:
    (a) polyamide, and
    (b) polyalkyl acrylate,
wherein said layers (I)–(III) are adhesively bonded to one another.

2. The multilayer plastic pipe according to claim 1, wherein said outer layer (I) comprises a molding composition containing polyamide.

3. The multilayer plastic pipe according to claim 1, wherein said inner layer (II) comprises a vinylidene fluoride copolymer.

4. The multilayer plastic pipe according to claim 1, wherein said layer (III) is a molding composition based on a mixture of from 50 to 90% by weight, based on the total weight of layer (III), of polyamide (a) and from 10 to 50% by weight of polyalkyl acrylate (b), based on the total weight of layer (III).

5. The multilayer plastic pipe according to claim 1, wherein said layer (III) is a molding composition based on the mixture of from 60 to 80% by weight, based on the total weight of layer (III), of polyamide (a) and from 20 to 40% by weight of polyalkyl acrylate (b), based on the total weight of layer (III).

6. The multilayer plastic pipe according to claim 1, wherein said polyalkyl acrylate (b) comprises:

i) from 40 to 80% by weight, based on the total weight of (b),

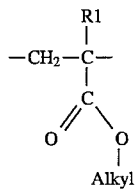

ii) from 10 to 50% by weight, based on the total weight of (b),

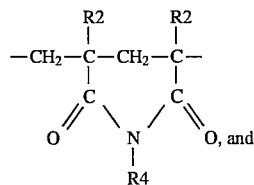

iii) from 1 to 15% by weight, based on the total weight of (b),

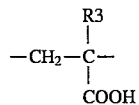

where alkyl is methyl, ethyl, propyl, butyl or hexyl, and $R_1$ to $R_4$, which are each identical or different, are hydrogen or $C_1$–$C_6$-alkyl.

7. The multilayer plastic pipe according to claim 1, wherein said polyalkyl acrylate (b) is a copolymer of methacrylate, styrene and maleic anhydride, wherein the total amount of styrene and maleic anhydride used is not more than 50% by weight.

8. The multilayer plastic pipe according to claim 1, wherein said polyalkyl acrylate (b) comprises:

(i) less than 100% by weight, based on the total weight of (b), of the unit:

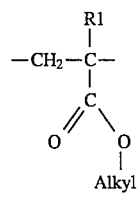

(ii) less than 100% by weight, based on the total weight of (b), of the unit:

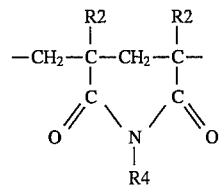

and (iii) less than 30% by weight, based on the total weight of (b), of the unit:

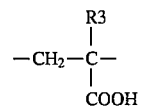

where alkyl is methyl, ethyl, propyl, butyl or hexyl, and $R_1$ to $R_4$, which are each identical or different, are hydrogen or $C_1$–$C_6$-alkyl.

9. The multilayer plastic pipe according to claim 8, wherein said alkyl and $R_1$ to $R_4$ are each methyl.

10. The multilayer plastic pipe according to claim 1, wherein said outer layer (I) and said inner layer (II) are of identical composition.

11. A hollow article comprising a multilayer plastic pipe comprising, (I) at least one outer layer, and (II) at least one inner layer comprising a polyvinylidene fluoride molding composition, and (III) a layer, disposed between said outer layer (I) and said inner layer (II), comprising a molding composition comprising a mixture of:

(a) polyamide, and (b) polyalkyl acrylate, wherein said layers (I)–(III) are adhesively bonded to one another.

* * * * *